United States Patent
Abe et al.

(10) Patent No.: US 6,866,291 B2
(45) Date of Patent: Mar. 15, 2005

(54) AIRBAG

(75) Inventors: Kazuhiro Abe, Shiga (JP); Weixin Gu, Shiga (JP)

(73) Assignee: Takata Corporation, Tokyo (JP)

( * ) Notice: Subject to any disclaimer, the term of this patent is extended or adjusted under 35 U.S.C. 154(b) by 19 days.

(21) Appl. No.: 10/193,183

(22) Filed: Jul. 12, 2002

(65) Prior Publication Data

US 2003/0020264 A1 Jan. 30, 2003

(30) Foreign Application Priority Data

Jul. 24, 2001 (JP) ........................................ 2001-223339

(51) Int. Cl.$^7$ ............................................. B60R 21/24
(52) U.S. Cl. ................................................... 280/729
(58) Field of Search ............................... 280/729, 743.1

(56) References Cited

U.S. PATENT DOCUMENTS

| | | | | | |
|---|---|---|---|---|---|
| 5,253,892 | A | * | 10/1993 | Satoh | ........................ 280/731 |
| 5,358,273 | A | * | 10/1994 | Onishi et al. | ............ 280/743.1 |
| 5,529,337 | A | * | 6/1996 | Takeda et al. | ............. 280/729 |
| 6,059,312 | A | * | 5/2000 | Staub et al. | ................ 280/729 |
| 6,086,092 | A | * | 7/2000 | Hill | ............................ 280/729 |
| 6,224,101 | B1 | | 5/2001 | Nishijima et al. | |
| 6,254,121 | B1 | * | 7/2001 | Fowler et al. | ............. 280/729 |
| 6,308,983 | B1 | | 10/2001 | Sinnhuber | |
| 6,517,109 | B1 | * | 2/2003 | Van Poppel | ............ 280/743.1 |
| 6,588,798 | B2 | * | 7/2003 | Bohn et al. | .............. 280/743.1 |
| 2002/0041090 | A1 | | 4/2002 | Whollebe et al. | |

FOREIGN PATENT DOCUMENTS

| | | |
|---|---|---|
| EP | 0 657 329 | 6/1995 |
| JP | 61-182353 | 11/1986 |
| JP | 1-247242 | 10/1989 |
| JP | 5-155300 | 6/1993 |
| WO | 00/03898 | 1/2000 |

* cited by examiner

*Primary Examiner*—Thomas Price
(74) *Attorney, Agent, or Firm*—Manabu Kanesaka

(57) ABSTRACT

An airbag is formed by an outer panel member for constituting the bag having a front side and a rear side with an opening for receiving gas to be inflated. The airbag includes at least three compartments arranged inside the bag including a first compartment communicating with the opening, a second compartment situated adjacent to the first compartment, and a third compartment situated adjacent to the second compartment. The gas flows from the first compartment to the third compartment through the second compartment.

13 Claims, 4 Drawing Sheets

AIRBAG

BACKGROUND OF THE INVENTION AND RELATED ART STATEMENT

The present invention relates to an airbag for protecting a passenger in an emergency, such as a car crash, and more specifically, relates to an airbag suitable for a driver-side airbag installed in a steering device.

In a driver-side airbag apparatus, an airbag folded and housed in a retainer has been widely used, and a cover member, such as a module cover, covers the airbag. When a sensor detects a car crash, an inflator is activated, and generates gas (inflation gas) to inflate the airbag.

In Japanese Patent Publications (KOKAI) No. 01-247242 and No. 05-155300, a driver-side airbag having two compartments, namely a central compartment and a peripheral compartment, is disclosed. A partitioning panel divides inside of the airbag to form the two compartments, and the central compartment inflates first followed by the peripheral compartment. The partitioning panel has through ports or holes for the gas to flow out. The partitioning panel connects rear and front panels of the airbag to prevent the airbag from protruding forward when inflated.

Since the above-described airbag with the two compartments has a relatively large volume, the inflator, i.e. gas generator, is required to have a large capacity to inflate a peripheral portion of the airbag quickly, resulting in relatively poor gas efficiency.

An object of the present invention is to provide an airbag that improves the gas efficiency compared to the conventional airbag to protect a passenger even with a small capacity inflator.

Further objectives and advantages of the invention will be apparent from the following description of the invention.

SUMMARY OF THE INVENTION

The present invention provides an airbag with an opening at a rear thereof for gas intake, and facing a passenger when inflated. The airbag includes at least three compartments, namely the first compartment, the second compartment adjacent to the first compartment, and the third compartment adjacent to the second compartment. An inside of the airbag is divided to form the three compartments, and the gas flows from the first compartment into the third compartment via the second compartment.

In such an airbag, the gas is supplied through the opening of the airbag from an inflator inserted into the opening to inflate the airbag. The gas first inflates the first compartment, then the second compartment, and subsequently the third compartment. Accordingly, the gas is held in the airbag longer than in a conventional airbag, resulting in improved gas efficiency.

In the airbag according to the present invention, the inside of the airbag is partitioned into at least three compartments. The first, second, and third compartments are inflated in that order, thereby allowing the first compartment to inflate early and the second compartment to inflate next. With this arrangement, a part of the airbag occupied by the first and second compartments inflates at a relatively early stage after the inflator is activated, thereby allowing a large part of the airbag to inflate early.

In the airbag according to the present invention, the first compartment may extend from the opening to the front surface of the airbag when the airbag is inflated. This arrangement enables the central part of the airbag to inflate early. In such a case, the airbag preferably has a configuration in which the second and third compartments surround an outer periphery of the first compartment, and the second compartment is disposed in front of the third compartment. With this configuration, the second compartment is inflated and expanded laterally in front of the inflated first compartment, thereby allowing the airbag to receive a passenger at side portions thereof at an early stage.

Further, the airbag according to the present invention may have a configuration in which the second compartment surrounds the outer periphery of the first compartment, and the third compartment surrounds an outer periphery of the second compartment. This configuration allows the second compartment adjacent to the first compartment to inflate early so as to surround the first compartment.

Further, the airbag according to the present invention may have a configuration in which the first compartment is disposed only along a rear part of the airbag, and the second and third compartments are disposed in front of the first compartment. With this configuration, the airbag inflates laterally on a large scale at an early stage after the inflator is activated, and then inflates toward a passenger.

In such a case, the second compartment is preferably disposed in a central part of the airbag, and the third compartment is preferably disposed outside the second compartment. This configuration allows the first compartment and subsequently the second compartment in the central part of the airbag to inflate early and also allows the second compartment to receive a passenger. The second compartment may be disposed in the central part of the airbag, and the third compartment may be disposed so as to surround the outer periphery of the second compartment. Even in this case, the first and second compartments inflate relatively early.

The airbag according to the present invention may further include at least one through port or hole for allowing the first and third compartments to communicate with each other. This configuration makes the third compartment inflate early.

The airbag according to the present invention may further include at least one vent hole. A compartment into which the gas flows last communicates with an outside of the airbag through the vent hole. This vent hole absorbs a shock when a passenger crashes onto the airbag. However, it is possible that the passenger may crash onto the airbag before the last compartment is fully inflated. In such a case, since the gas discharging from the second compartment to the third compartment can absorb an impact, the airbag without a vent hole can sufficiently absorb the impact.

DETAILED DESCRIPTION OF THE EMBODIMENTS

Figure 1A:
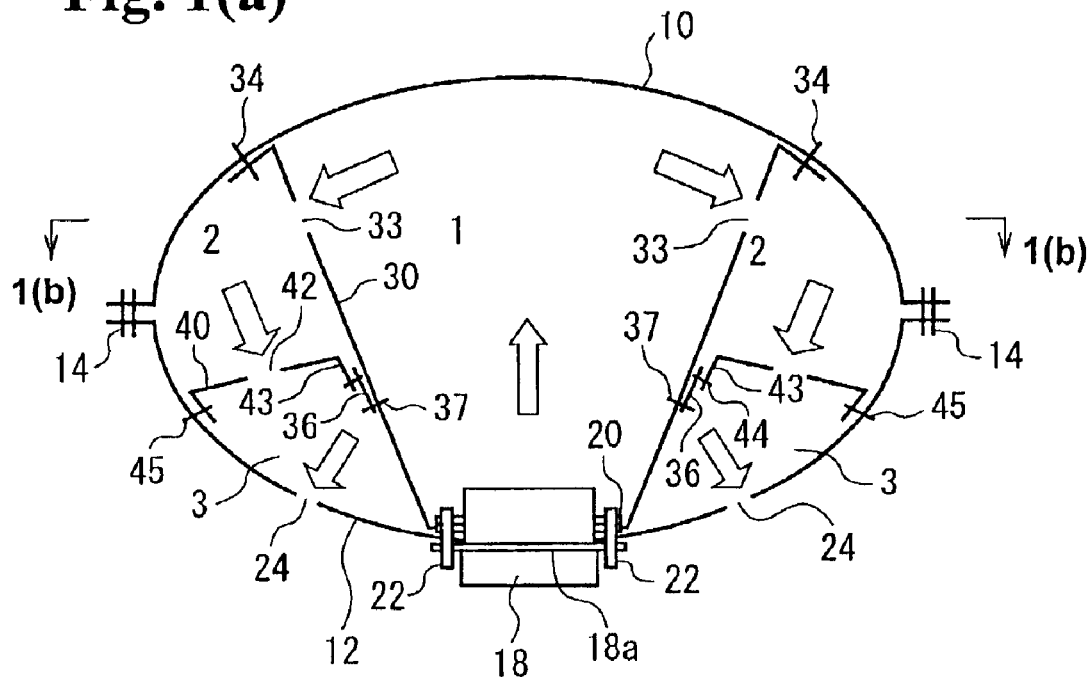
FIG. 1(a) is a sectional view of an inflated airbag according to an embodiment.
Figure 1B:
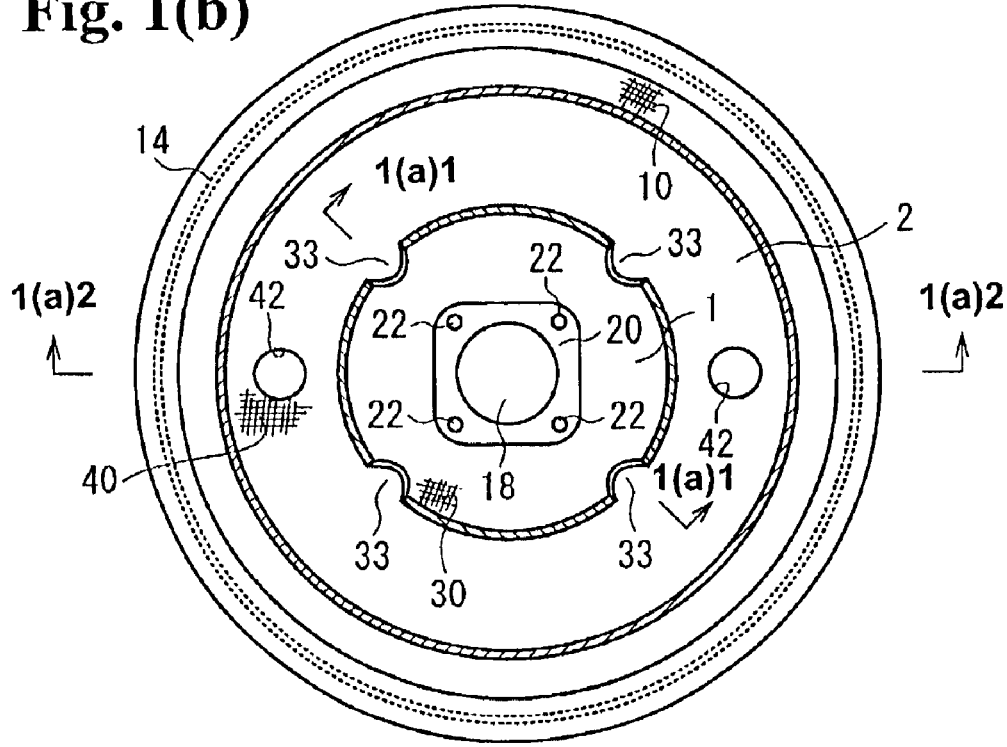
FIG. 1(b) is a sectional view taken along line 1(b)—1(b) in FIG. 1(a)
Figure 2A:
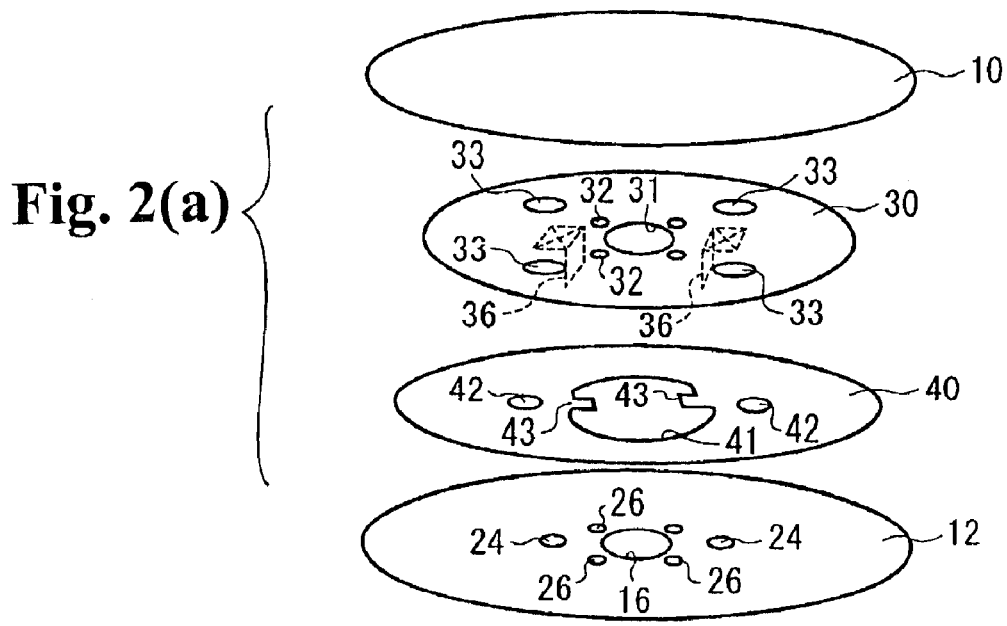
FIG. 2(a) is an exploded perspective view of an airbag.
Figure 2B:
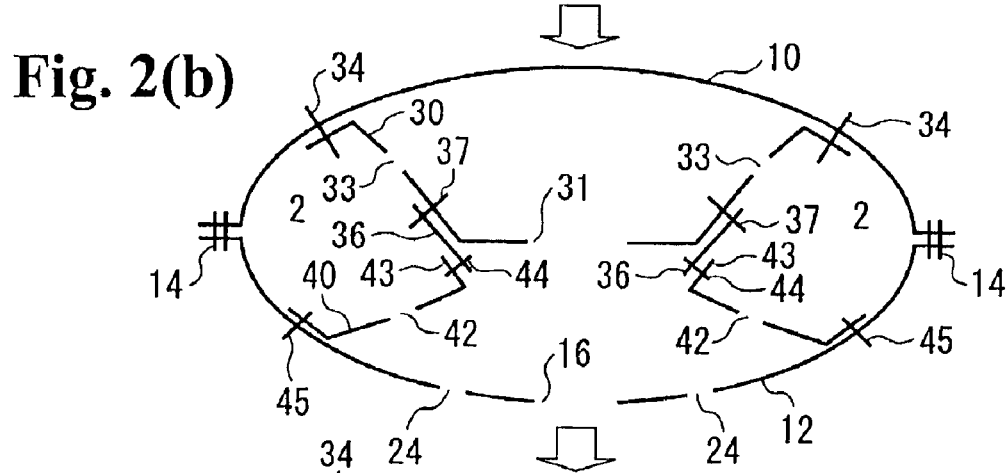
FIGS. 2(b) and 2(c) are sectional views of the same.
Figure 2C:
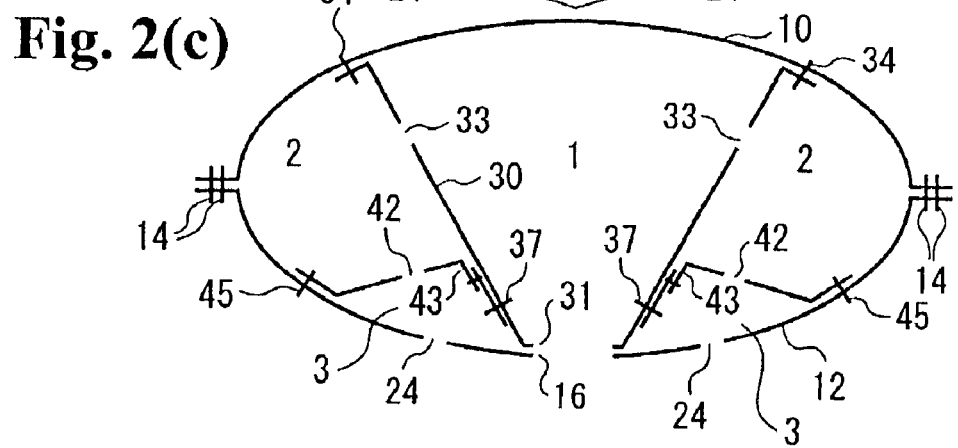

Hereunder, embodiments of the present invention will be explained with reference to the accompanied drawings. FIG. 1(a) is a longitudinal sectional view of an inflated airbag according to an embodiment, and FIG. 1(b) is a sectional view taken along a line 1(b)—1(b) in FIG. 1(a). FIG. 2(a) is an exploded perspective view illustrating a configuration of an airbag, and FIGS. 2(b) and 2(c) are sectional views of the same.

An upper half of FIG. 1(a) is a sectional view taken along a line 1(a)1—1(a)1, and a lower half of FIG. 1(a) is a sectional view taken along a line 1(a)2—1(a)2 in FIG. 1(b), respectively.

The airbag has an outer shell formed of a round front panel 10 and a round rear panel 12. The front panel 10 and the rear panel 12 are stitched together with a suture thread 14 at an outside periphery thereof so as to form a bag. The rear panel 12 has an opening 16 in a central part thereof for receiving an inflator 18. The rear panel 12 also has a plurality of small holes 26 around the opening 16 for allowing a plurality of bolts 22 to pass therethrough, so that an edge of the opening 16 is firmly clamped between a pressure ring 20 and a flange 18a of the inflator 18 with the bolts 22 and a plurality of nuts (not shown) that are securely tightened by the corresponding bolts. In addition, the rear panel 12 has a plurality of vent holes 24 thereon.

The inside of the airbag is partitioned into the first compartment 1, the second compartment 2, and the third compartment 3 by the first inner panel 30 and the second inner panel 40. The first inner panel 30 has an opening 31 in a central part thereof for allowing the inflator 18 to be inserted therein and a plurality of small holes 32 around the opening 31 for allowing the bolts 22 to pass therethrough. Although the first inner panel 30 has four through ports 33 therein for allowing gas to flow therethrough, the number of the through ports 33 is not limited thereto.

An inner periphery of the first inner panel 30 is clamped between the flange 18a of the inflator 18 and the pressure ring 20. An outer periphery of the first inner panel 30 is stitched with the front panel 10 by a suture thread 34.

The first inner panel 30 has a plurality of lug pieces 36 with base ends thereof stitched to the first inner panel 30 with a suture thread 37. Although the two lug pieces 36 are provided in this embodiment, the number of the lug pieces is not limited thereto. The lug pieces 36 are provided at positions between the adjacent through ports 33 or near these positions.

The second inner panel 40 has an opening 41 in a central part thereof and a plurality of through ports 42 at middle in a radial direction of the panel for allowing the gas to flow. The opening 41 has two pieces of tabs 43 extending from an inner portion thereof toward the center of the opening 41. It is preferable that the tabs 43 be formed integrally with the second inner panel 40. The tabs 43 are stitched together with front ends of the lug pieces 36 with a suture thread 44.

The outer periphery of the first inner panel 30 is stitched to the front panel 10 with the suture thread 34, and the outer periphery of the second inner panel 40 is stitched to the rear panel 12 with a suture thread 45. The lug pieces 36 of the first inner panel 30 and the tabs 43 of the second inner panel 40 are stitched together, and the outer peripheries of the front panel 10 and the rear panel 12 are stitched together, as shown in FIG. 2(b).

As shown in FIGS. 1(a), 1(b), and 2(c), the opening 31 at the central part of the first inner panel 30 is coaxially aligned with the opening 16 of the rear panel 12, and the edges of the openings 16 and 31 are clamped by the bolts 22 between the pressure ring 20 and the flange 18a (not shown in FIG. 2(c)) of the inflator 18. Although not shown, an edge of an inflator mounting hole situated in a retainer for mounting the airbag is also clamped between the pressure ring 20 and the flange 18a.

The first compartment 1 is configured to be encircled by the first inner panel 30 and the front panel 10. The front end of the inflator 18 is inserted in the first compartment 1 through the openings 16 and 31. The first compartment 1 extends from the rear to the front at the central part of the airbag.

The second compartment 2 is positioned outside the first inner panel 30 and also in front of the second inner panel 40. The second compartment 2 communicates with the first compartment 1 via the through ports 33.

The third compartment 3 is positioned outside the first inner panel 30 and also behind the second inner panel 40. The third compartment 3 communicates with the second compartment 2 via the through ports 42 and with the outside of the airbag via the vent holes 24.

When the inflator 18 is actuated to discharge the gas, the gas first inflates the first compartment 1. Then, the gas enters the second compartment 2 via the through port 33 and inflates the second compartment 2. Subsequently, the gas enters the third compartment 3 via the through ports 42 and inflates the third compartment 3.

As described above, when the inflator 18 is activated, the first compartment 1 arranged in the central part of the airbag expands early, and then the second compartment 2 expands in a sideward direction (in a radial direction) thereof at the front side of the first compartment 1. Accordingly, the first and second compartments 1 and 2 expand early in the radial direction thereof. Since the first and second compartments 1 and 2 have small capacities relative to a total volume of the airbag, the first and second compartments 1 and 2 expand substantially early even when the inflator 18 has a small output. The first inner panel 30 is disposed so as to bridge the front panel 10 and the pressure ring 20, preventing an excessive protrusion of the airbag forwardly (i.e., in a direction toward a passenger) at the early stage of inflation.

In FIGS. 1(a) to 2(c), the front panel 10 and the rear panel 12 have a seam allowance or flap extending out of the airbag. However, as shown in FIG. 3, the seam allowance may be arranged inside the airbag.

In such a case, the front panel 10 with which the first inner panel 30 is stitched together and the rear panel 12 with which the second inner panel 40 is stitched together are coaxially aligned, and the outer peripheries thereof are stitched together. Then, the airbag is turned inside out through the opening 16. Subsequently, the lug pieces 36 and the tabs 43 are pulled out of the opening 16 and are stitched together to construct the airbag as shown in FIG. 3.

Figure 3:
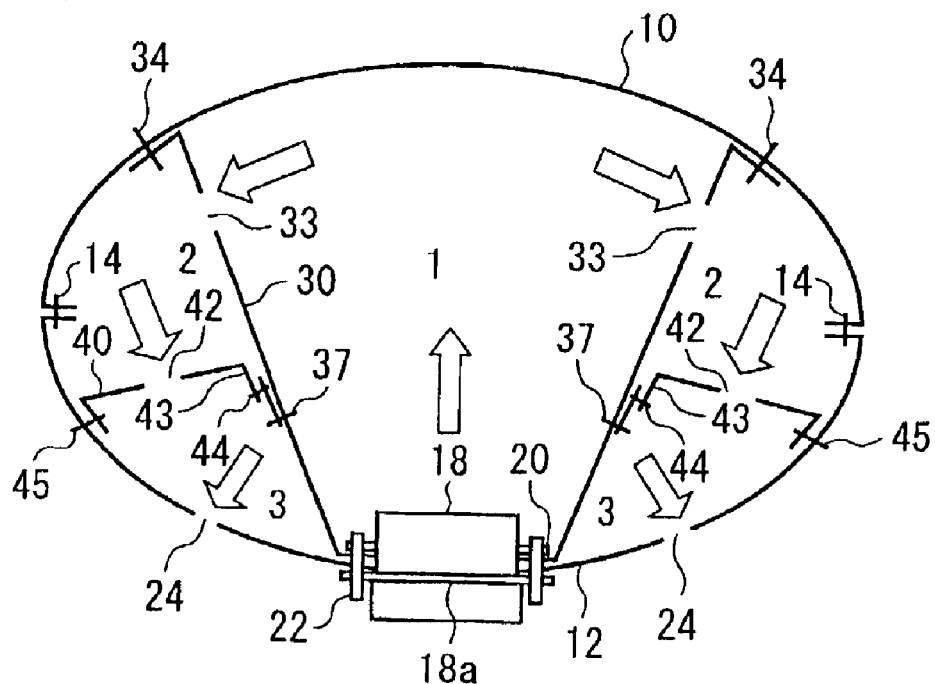
FIG. 3 is a sectional view of an airbag according to another embodiment.

When a passenger crashes onto the airbag shown in FIGS. 1 to 3, the gas is partially discharged through the vent holes 24 to absorb the impact. However, when the sizes of each panel and each through port, stitching positions, and an output of the inflator 18 are properly designed so that the passenger crashes onto the airbag before the third compartment 3 is fully inflated, the vent holes may be omitted. In such a case, the gas is discharged from the second compartment 2 to the third compartment 3 to absorb the impact.

The through ports 42 of the second inner panel 40 may be omitted in the present invention. In such a case, the gas flows into the third compartment 3 from the second compartment 2 passing through the gap between the inner periphery of the opening 41 of the second inner panel 40 and the first inner panel 30.

Figure 4:
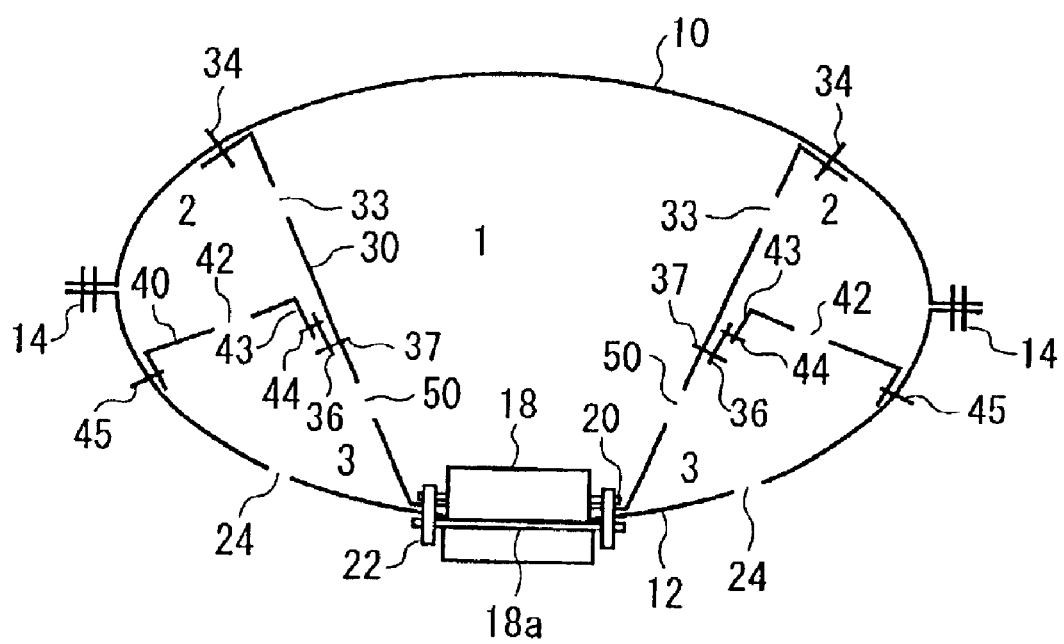
FIG. 4 is a sectional view of an airbag according to another embodiment.

According to the present invention, the first inner panel 30 may have a plurality of through ports 50 for allowing the first and third compartments 1 and 3 to directly communicate with each other as shown in FIG. 4. This arrangement allows the third compartment 3 to expand early.

Figure 5:
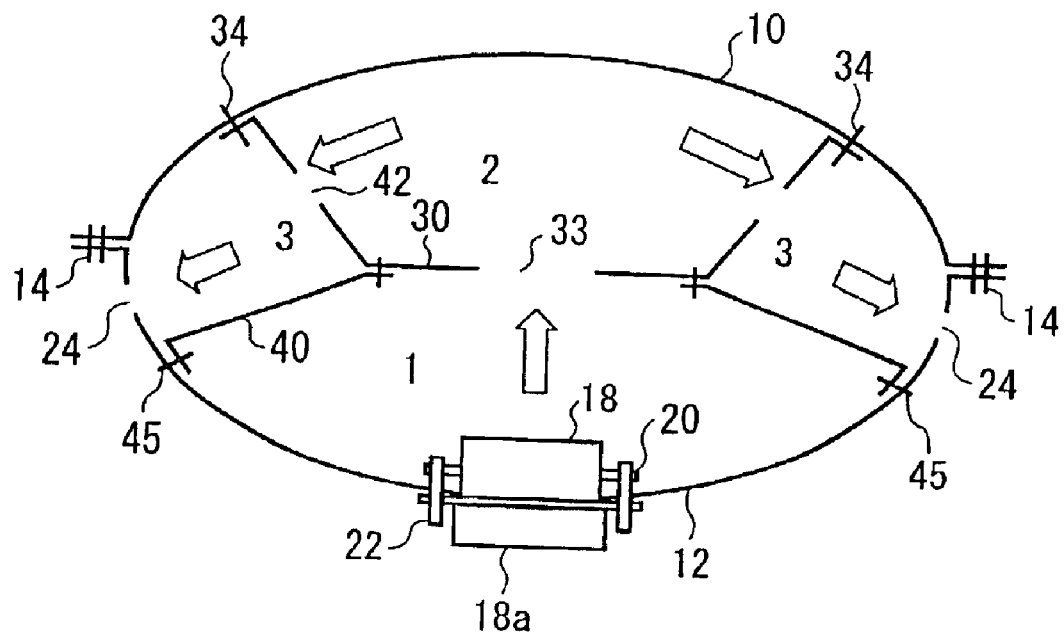
FIG. 5 is a sectional view of an airbag according to another embodiment.

As shown in FIG. 5, another airbag is configured such that the first inner panel 30 is not connected to the pressure ring 20 and is positioned away from the rear panel 12. In such an airbag, the first compartment 1 is disposed along the rear panel 12 at the rear of the airbag, the second compartment 2 is disposed along the central part of the front panel 10 at the front of the airbag, and the third compartment 3 is disposed along the outer region of the front panel and in front of the first compartment 1. The through ports 42 for allowing the second and third compartments 2 and 3 to communicate with each other are formed on the first inner panel 30. The second inner panel 40 has no through port. Since the other configuration in FIG. 5 is the same as that of the airbag shown in FIGS. 1(a) to 2(c), the same reference numerals denote the corresponding parts.

In the airbag shown in FIG. 5, when the inflator 18 is activated, the first compartment 1 in the rear part of the airbag expands early, then the second compartment 2 in the central front part of the airbag expands, and finally the third compartment 3 in the outer region of the front part of the airbag expands. In such a case, the first and second compartments 1 and 2 expand early, thereby allowing the airbag to receive the passenger early even when an output of the inflator 18 is small.

In FIG. 5, the first and second compartments 1 and 2 are partitioned by the inner peripheral part of the first inner panel 30, and the inner peripheral part of the second inner panel 40 is connected to the first inner panel 30 at middle in the radial direction. Alternatively, the first and second compartments 1 and 2 may be partitioned by the second inner panel 40 by extending the inside peripheral end of the second inner panel 40 toward the center of the airbag. In such a case, the inside peripheral end of the first inner panel is connected to the second inner panel at middle in the radial direction.

Figure 6:
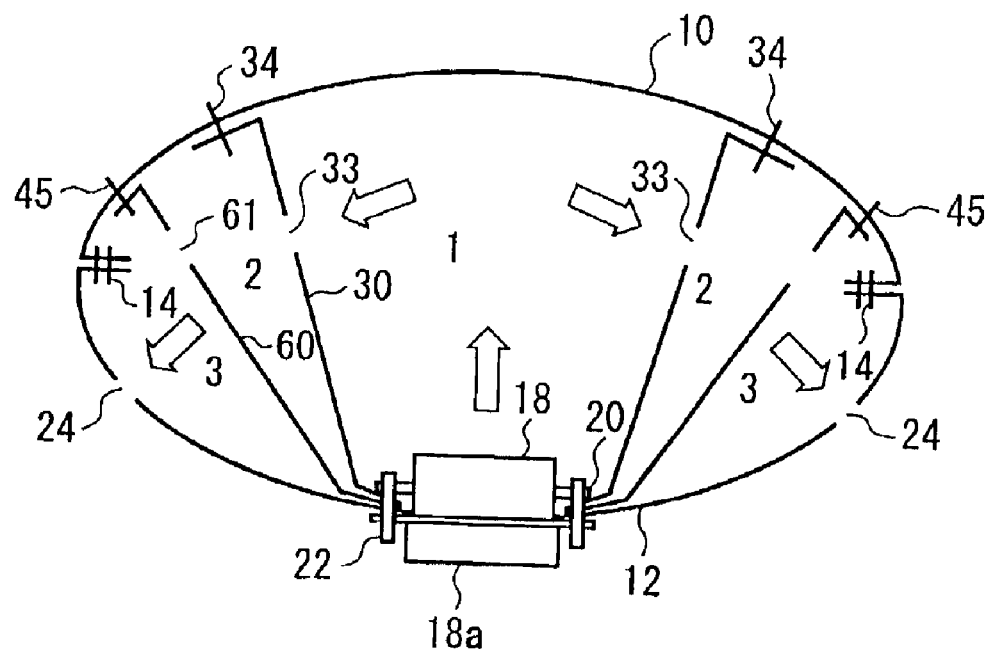
FIG. 6 is a sectional view of an airbag according to still another embodiment.

FIG. 6 shows an airbag having another configuration in which a second inner panel 60 is disposed outside the first inner panel 30 so as to be sandwiched between the pressure ring 20 and the front panel 10. The second inner panel 60 has a plurality of through ports 61 for allowing the second and third compartments 2 and 3 to communicate with each other. The first compartment 1 is arranged inside the first inner panel 30, and is surrounded by the second compartment 2, and the third compartment 3 from the outside of the second compartment 2. Since the other configuration in FIG. 6 is the same as that of the airbag shown in FIGS. 1(a) to 2(c), the same reference numerals denote the corresponding parts. Likewise, in this airbag, when the inflator 18 is activated, the first and second compartments 1 and 2 expand early.

The above embodiments are described using examples, and the present invention is applicable to a variety of configurations other than those shown in the drawings. For example, although three compartments are provided in the embodiments, four or more compartments may be provided.

The airbags shown in the embodiments have a point symmetrical structure substantially in a circumferential direction thereof with respect to the center point of the opening 16, however, the present invention is not limited to such a structure. For example, the outer shape of the airbag may be a hexahedron or a polyhedron. Furthermore, for example, the second and third compartments may be disposed only in a part of the airbag in the circumferential direction thereof. Although, the threads are used for stitching as boding means in the embodiments, an adhesive may be used alternatively. The present invention is also applicable to airbags other than the driver-side airbag.

As described above, the airbag, in which a major part of which expands early even when an output of the inflator is small, is provided according to the present invention.

While the invention has been explained with respect to the specific embodiments of the invention, the explanation is illustrative and the invention is limited only by the appended claims.

What is claimed is:

1. An airbag comprising:
   an outer panel member for constituting the airbag having a front side and a rear side with an opening for receiving gas to be inflated at the rear side,
   a first panel extending between the front side and the rear side to form a first compartment at a center area of the airbag, said first compartment communicating with the opening and surrounded by the first panel, and,
   a second panel fixed to the outer panel outside the first panel to form a second compartment and a third compartment outside the first compartment so that the gas entering through the opening flows from the first compartment to the second and third compartments.

2. An airbag according to claim 1, wherein the first compartment extends from the opening toward the front side of the airbag in an expanded state.

3. An airbag according to claim 2, wherein said second and third compartments surround the first compartment, and the second compartment is disposed in front of the third compartment in the expanded state.

4. An airbag according to claim 2, wherein said second compartment surrounds the first compartment, and the third compartment surrounds the second compartment in the expanded state.

5. An airbag according to claim 1, further comprising at least one through port disposed between the first and third compartments for allowing the gas to enter the third compartment therethrough.

6. An airbag according to claim 1, further comprising at least one vent hole formed in a compartment where the gas enters last, through which the gas flows out of the airbag.

7. An airbag according to claim 1, wherein said first panel includes a plurality of first communicating portions for communicating the first compartment with the second compartment to allow the gas to flow from the first compartment to the second compartment, and the second panel includes second communicating portions for communicating the second compartment with the third compartment.

8. An airbag according to claim 7, wherein said first and second communicating portions are holes arranged to offset from each other in a peripheral direction relative to the opening.

9. An airbag according to claim 1, wherein said first panel is fixed to the front and rear sides of the outer panel member and has a plurality of first communicating portions, and the second panel is connected at one end thereof to the first panel and at the other end to the outer panel member and has a plurality of second communicating portions so that the gas enters to the third compartment through the first and second communicating portions.

10. An airbag according to claim 1, wherein said second panel is fixed to the front and rear sides of the outer panel member outside the first panel so that the second compartment is located between the first and second panels.

11. An airbag comprising:

an outer panel member for constituting the airbag having a front side and a rear side with an opening for receiving gas to be inflated at the rear side, a first panel fixed to the outer panel member to have a portion extending at least partly laterally to form a first compartment at a rear side of the airbag communicating with the opening, and a second panel fixed to the outer panel and a middle of the first panel to form a second compartment in a middle of the airbag above the first compartment and to form a third compartment around the second compartment above the first compartment so that the gas entering through the opening flows from the first compartment to the third compartment through the second compartment.

12. An airbag according to claim 11, wherein said first panel is connected to the front side, and the second panel is connected at one side to a middle of the first panel and at the other side to the rear side.

13. An airbag according to claim 12, wherein said first panel has one first communicating portion in a center thereof to communicate between the first and second compartments, and a plurality of second communicating portions around the first communicating portion to communicate between the second and third compartments.

* * * * *